United States Patent
Kuo et al.

(10) Patent No.: US 8,374,288 B1
(45) Date of Patent: Feb. 12, 2013

(54) DUMMY BURST DETECTING METHOD AND APPARATUS

(75) Inventors: Chun-Ming Kuo, Taipei County (TW); I-Ping Chang, Tainan (TW); YingYing Chen, Taipei (TW); Hung-Shiun Fu, Hsin-Chu Hsien (TW); Wei-nan Sun, Hsinchu Hsien (TW)

(73) Assignee: Mediatek Inc., Hsin-Chu (TW)

( * ) Notice: Subject to any disclaimer, the term of this patent is extended or adjusted under 35 U.S.C. 154(b) by 763 days.

(21) Appl. No.: 11/778,198

(22) Filed: Jul. 16, 2007

Related U.S. Application Data

(60) Provisional application No. 60/825,961, filed on Sep. 18, 2006.

(51) Int. Cl.
*H04L 27/06* (2006.01)
(52) U.S. Cl. ........................................ 375/340; 375/316
(58) Field of Classification Search .................. 375/340
See application file for complete search history.

(56) References Cited

U.S. PATENT DOCUMENTS

| | | | |
|---|---|---|---|
| 5,481,561 A * | 1/1996 | Fang | 370/320 |
| 6,298,095 B1 * | 10/2001 | Kronestedt et al. | 375/295 |
| 6,647,000 B1 * | 11/2003 | Persson et al. | 370/330 |
| 2002/0069038 A1 * | 6/2002 | Cooper | 702/191 |
| 2002/0072334 A1 * | 6/2002 | Dunne et al. | 455/67.1 |
| 2004/0132457 A1 * | 7/2004 | Sanders et al. | 455/450 |
| 2006/0007994 A1 * | 1/2006 | Lai et al. | 375/227 |
| 2006/0121911 A1 * | 6/2006 | Zhang et al. | 455/452.2 |
| 2006/0198371 A1 * | 9/2006 | Huang et al. | 370/389 |
| 2006/0270442 A1 * | 11/2006 | Miller et al. | 455/522 |
| 2007/0047587 A1 * | 3/2007 | Kuo et al. | 370/497 |
| 2007/0183522 A1 * | 8/2007 | Garrett et al. | 375/260 |
| 2008/0137179 A1 * | 6/2008 | Li et al. | 359/337.13 |
| 2008/0207141 A1 * | 8/2008 | O'Keefe et al. | 455/91 |
| 2009/0296629 A1 * | 12/2009 | Lincoln et al. | 370/321 |

\* cited by examiner

*Primary Examiner* — Erin File
(74) *Attorney, Agent, or Firm* — McClure, Qualey & Rodack, LLP

(57) ABSTRACT

A dummy burst detection method. The method begins with generating a dummy burst nominal power $\eta_{DB}^2$ of a received burst and a normal burst nominal power $\eta_{NB}^2$ of the received burst, wherein the dummy burst nominal power $\eta_{DB}^2$ is generated based on the hypotheses that the received burst is a dummy burst, and the normal burst nominal power $\eta_{NB}^2$ is formed based on the hypotheses that the received burst is a normal burst. A likelihood of the received burst is determined according to the dummy burst nominal power $\eta_{DB}^2$, the normal burst nominal power $\eta_{NB}^2$, and the noise power of the received burst.

15 Claims, 2 Drawing Sheets

DUMMY BURST DETECTING METHOD AND APPARATUS

CROSS REFERENCE

This application claims the benefit of U.S. provisional application Ser. No. 60/825,961 filed Sep. 18, 2006, the subject matter of which is incorporated herein by reference.

BACKGROUND OF THE INVENTION

1. Field of the Invention

The invention relates to radio communications, and, more particularly, to techniques of detecting a particular burst in a communication system.

In the General Packet Radio Service (GPRS)/Enhanced GPRS (EGPRS) system, uplink/downlink carrier is divided into radio frames and each frame is divided into eight time slots. A physical channel is a specified time slot in consecutive frames. There are five bursts that may be transmitted, which are normal burst, frequency correction burst, synchronization burst, dummy, and access burst. A base station (BS) transmits a dummy burst as filler in unused uplink/downlink carrier timeslots. Because the structure of a dummy burst is similar to a normal burst, detecting a dummy burst (or normal burst) may be important in GPRS/EGPRS systems.

For example, USF (uplink Status Flag) information in a normal burst transmitted by a base satiation may notify users able to transmit data on the uplink path in a specific time slot of the next frame. If a user misinterprets a dummy burst as a normal burst, an invalid USF is generated adversely affecting the data transmission rate and potentially dropping the connection. Thus, the ability to distinguish between a dummy burst and a normal burst is desirable.

BRIEF SUMMARY OF THE INVENTION

In one aspect of the invention, a dummy burst detection method is provided. The method begins with generating a dummy burst nominal power $\eta_{DB}^2$ of a received burst, wherein the dummy burst nominal power $\eta_{DB}^2$ is generated based on the hypotheses that the received burst is a dummy burst. A normal burst nominal power $\eta_{NB}^2$ is then generated. The normal burst nominal power $\eta_{NB}^2$ is formed based on the hypotheses that the received burst is a normal burst. A likelihood of the received burst is determined according to the dummy burst nominal power $\eta_{DB}^2$ and the normal burst nominal power $\eta_{NB}^2$.

In another aspect of the invention, a system for detecting a dummy burst is provided. The system comprises a dummy burst nominal power unit, a normal burst nominal power unit, a likelihood unit, and a decision unit. The dummy burst nominal power unit generates a dummy burst nominal power of a received burst, wherein the dummy burst nominal power is formed according to a first hypothesis that the received burst is a dummy burst. The normal burst nominal power unit generates a normal burst nominal power of the received burst, wherein the normal burst nominal power is formed according to a second hypothesis that the received burst is a normal burst. The likelihood unit determines a likelihood of the received burst according to the dummy burst nominal power, the normal burst nominal power, and the noise power of the received burst.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
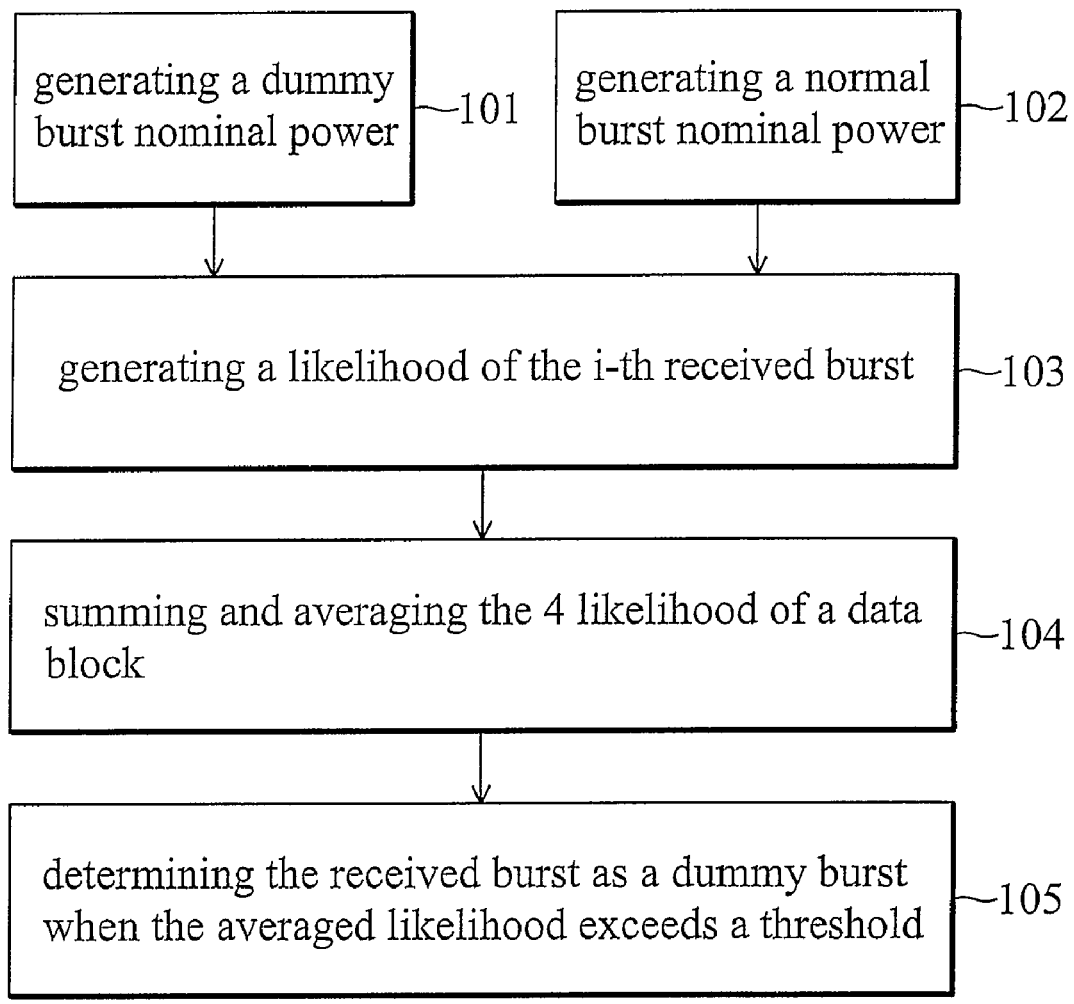
FIG. 1 shows a flowchart for detecting a dummy burst according to an embodiment of the invention.

FIG. 1 shows a flowchart for detecting a dummy burst according to an embodiment of the invention. The flowchart begins with generating a dummy burst nominal power $\eta_{DB}^2$ of a received burst in step 101, wherein the dummy burst nominal power $\eta_{DB}^2$ is generated based on the hypotheses that the received burst is a dummy burst. In step 102, a normal burst nominal power $\eta_{NB}^2$ is generated. The normal burst nominal power $\eta_{NB}^2$ is formed based on the hypotheses that the received burst is a normal burst. The sequence of steps 101 and 102 can be exchanged without affecting the result of dummy burst detection. In step 103, a likelihood of the received burst is generated according to the dummy burst nominal power $\eta_{DB}^2$ and the normal burst nominal power $\eta_{NB}^2$. For example, the likelihood of the received burst may be generated by a cost function E, where E is formed by subtracting the dummy burst nominal power $\eta_{DB}^2$ from the normal burst nominal power $\eta_{NB}^2$. If the cost function E exceeds a threshold, in step 105, the received burst is determined to be a dummy burst. Otherwise, the received burst is determined to be a normal burst.

In EGPRS (Enhanced GPRS) systems, a data block consists of 4 normal bursts or 4 dummy bursts. 4 normal bursts of one data block have the same modulation scheme, and 4 dummy bursts of one data block use same training sequence. Thus, to prevent channel noise from disturbing the cost function E, the burst cost function E is summed and averaged in step 104. An example of averaged E is shown as following:

$$F = \sum_i \frac{E_i}{\sigma_i^2}, \qquad (1)$$

where i is the burst index, $\sigma_i^2$ is the noise power of the i-th burst. $\sigma_i^2$ may be calculated by:

$$\sigma_i^2 = E[r^2] - \max[\eta_{DB}^2, \eta_{NB}^2], \qquad (2)$$

where $E[r^2]$ is the expectation of square of the received burst.

In one embodiment of the invention, such as an EGPRS system in which Gaussian Minimum Shift Keying (GMSK) and 8-ary Phase Shift Keying (i.e., 8-PSK or EPSK) are used, the normal burst nominal power $\eta_{NB}^2$ is generated by selecting the larger of $\eta_{GMSK}^2$ and $\eta_{EPSK}^2$. The GMSK nominal power $\eta_{GMSK}^2$ is formed according to a hypothesis that the received burst is a normal burst modulated by Gaussian Minimum Shift Keying (GMSK), and the EPSK normal burst nominal power $\eta_{EPSK}^2$ is formed according to hypotheses that the received burst is a normal burst modulated by 8-ary Phase Shift Keying (EPSK). By selecting the larger of radio frequency channel C0 nominal power $\eta_{C0}^2$ and Cordless Telephony System (CTS) Control Channel (CTSC) nominal power $\eta_{CTSC}^2$, the dummy burst nominal power $\eta_{DB}^2$ is generated. Similarly, the C0 nominal power $\eta_{C0}^2$ is formed according to a hypothesis that the received burst is a dummy burst with a C0 sequence, and the CTSC nominal power $\eta_{CTSC}^2$ is formed according to a hypothesis that the received burst is a dummy burst with a mapped sequence CTSC. It should be understood that the detection method of the invention is not limited to the described embodiments. Any alternative method for detecting the likelihood of each burst from a dummy burst nominal power and a normal burst is within the scope of the present invention.

Figure 2:
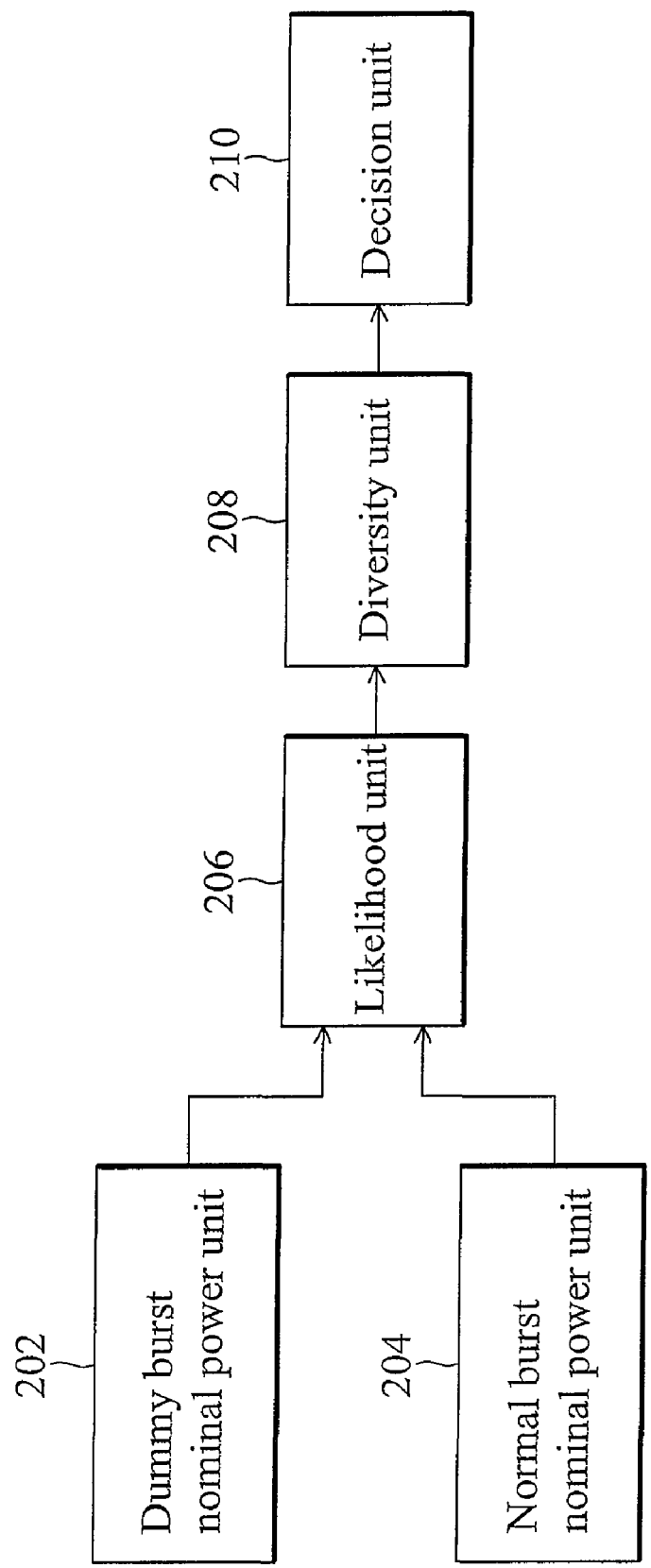
FIG. 2 shows a system for detecting a dummy burst. The system comprises a dummy burst nominal power unit, a normal burst nominal power unit, a likelihood unit, and a decision unit.

FIG. 2 shows a system for detecting a dummy burst. The system comprises a dummy burst nominal power unit 202, a normal burst nominal power unit 204, a likelihood unit 206, and a decision unit 208. The dummy burst nominal power unit 202 generates a dummy burst nominal power of a received burst, wherein the dummy burst nominal power is formed according to a first hypothesis that the received burst is a dummy burst. The normal burst nominal power unit 204 generates a normal burst nominal power of the received burst, wherein the normal burst nominal power is formed according to a second hypothesis that the received burst is a normal burst. The likelihood unit 206 determines a likelihood of the received burst according to the dummy burst nominal power, the normal burst nominal power, and the noise power of the received burst. For example, the likelihood unit 206 selects the larger of the dummy burst nominal power and the normal burst nominal power $\max_{[\eta_{DB}^2,\eta_{NB}^2]}$, generates the expectation of the square of the received burst $E[r^2]$ to represent the total power of the received burst, and subtracts $E[r^2]$ with the selected nominal power $\max[\eta_{DB}^2,\eta_{NB}^2]$ to obtain the noise power of the received burst $\sigma^2$ as indicated in Equation (2).

The decision unit 208 determines the received burst is a dummy burst if the likelihood of the received burst L exceeds a threshold, where $$L = \frac{\eta_{DB}^2 - \eta_{NB}^2}{\sigma^2},$$

$\eta_{DB}^2$ is the dummy burst nominal energy of the received burst, $\eta_{NB}^2$ is the normal burst nominal energy of a received burst, and $\sigma^2$ is the noise power of the received burst.

In other embodiments, system 20 further comprises a diversity unit 210. The diversity unit 210 collects all the likelihoods of received bursts among a data block, and the decision unit determines a received data block is a dummy burst block if the diversity unit output $L_s$ exceeds a threshold, where $$L_s = \sum_i \frac{\eta_{DB}^2(i) - \eta_{NB}^2(i)}{\sigma_i^2},$$

$\eta_{DB}^2(i)$ is the dummy burst nominal energy of a i-th burst of the received data block, $\eta_{NB}^2(i)$ is the normal burst nominal energy of the i-th burst of the received data block, and $\sigma_i^2$ is the noise power of the i-th burst of the received data block. In EGPRS systems, a data block consists of 4 normal burst or 4 dummy burst. The diversity unit 210 collects the likelihoods of 4 received burst among a data block to generate $L_s$.

The implementation of dummy burst nominal power unit 202 may vary, depends on which communication system is applied. For example, in the EGPRS system, the dummy burst nominal power unit 202 generates a C0 nominal power and a CTSC nominal burst and selects the larger of C0 nominal power and the CTSC nominal burst nominal power as the dummy burst nominal power. The C0 nominal power is formed according to a third hypotheses that the received burst is a dummy burst with a C0 sequence, and the CTSC nominal burst nominal power is formed according to a fourth hypotheses that the received burst is a dummy burst with a mapped sequence CTSC. Similarly, the implementation of the normal burst nominal power unit 204 may also vary as communication systems. In the EGPRS system, the normal burst nominal power unit 204 generates a GMSK nominal power and an EPSK nominal burst and selects the larger of GMSK nominal power and the EPSK nominal burst nominal power as the normal burst nominal power. The GMSK nominal power is formed according to a fifth hypothesis that the received burst is modulated by GMSK, and the EPSK nominal burst nominal power is formed according to a sixth hypothesis that the received burst is modulated by EPSK.

The dummy burst detection is applicable to various applications, such as Uplink Status Flag detection, Header false alarm, BFI, and others.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting a dummy burst, comprising:
   generating a dummy burst nominal power of a received burst, wherein the dummy burst nominal power is formed according to a first hypothesis that the received burst is a dummy burst;
   generating a normal burst nominal power of the received burst, wherein the normal burst nominal power is formed according to a second hypotheses that the received burst is a normal burst;
   determining that the received burst is a dummy burst when the likelihood exceeds a first threshold;
   generating a noise power of the received data; and
   determining a likelihood of the received burst according to the dummy burst nominal power, the normal burst nominal power, a noise power of the received burst.

2. The method as claimed in claim 1, wherein the step of generating the noise power $\sigma^2$ comprises:
   selecting a larger one of the dummy burst nominal power and the normal burst nominal power $^{max[\eta}{}_{DB}^2,\eta_{NB}^2]$;
   generating the expectation of the square of received burst $E[r^2]$; and
   subtracting $E[r^2]$ with the selected nominal power $^{max[\eta}{}_{DB}^2,\eta_{NB}^2]$ to obtain the noise power $\sigma^2$.

3. The method as claimed in claim 2, wherein the likelihood is derived by $$L = \frac{\eta_{DB}^2 - \eta_{NB}^2}{\sigma^2},$$

the L is the likelihood, $\eta_{DB}^2$ is the dummy burst nominal power of the received burst, $\eta_{NB}^2$ is the normal burst nominal power of the received burst, and $\sigma^2$ is the noise power of the received burst.

4. The method as claimed in claim 2, wherein the received burst is a GSM burst, and the likelihood is derived by $$L_s = \sum_i \frac{\eta_{DB}^2(i) - \eta_{NB}^2(i)}{\sigma_i^2},$$

where the Ls is the likelihood of a received data block, each received data block comprises a plurality of bursts indexed by i, $\eta_{DB}^2(i)$ is the dummy burst nominal power of an i-th burst of the received data block, $\eta_{NB}^2(i)$ is the normal burst nominal power of the i-th burst of the received data block, and $\sigma_i^2$ is the noise power of the i-th burst of the received data block.

5. The method as claimed in claim 1, wherein the step of generating the dummy burst nominal power further comprises:
  generating a radio frequency channel (C0) nominal power, wherein the C0 nominal power is formed according to a third hypotheses that the received burst is a dummy burst with a C0 sequence;
  generating a Corresponding Training Sequence Code (CTSC) nominal power, wherein the CTSC nominal power is formed according to a fourth hypotheses that the received burst is a dummy burst with a mapped sequence CTSC; and
  comparing the C0 nominal power and the CTSC nominal power and selecting a larger one between the C0 nominal power and the CTSC nominal power as the dummy burst nominal power.

6. The method as claimed in claim 1, wherein the step of generating the normal burst nominal power further comprises:
  generating a GMSK nominal power, wherein the GMSK nominal power is formed according to a fifth hypotheses that the received burst is a normal burst modulated by Gaussian Minimum Shift Keying (GMSK);
  generating an EPSK normal burst nominal power, wherein the EPSK normal burst nominal power is formed according to a sixth hypotheses that the
  received burst is a normal burst modulated by 8-ary Phase Shift Keying (EPSK);
  comparing the GMSK nominal power and the EPSK normal burst nominal power and selecting a larger one between the GMSK nominal power and the EPSK normal burst nominal power as the normal burst nominal power.

7. A system for detecting a dummy burst, comprising:
  a dummy burst nominal power unit for generating a dummy burst nominal power of a received burst, wherein the dummy burst nominal power is formed according to a first hypothesis that the received burst is a dummy burst;
  a normal burst nominal power unit for generating a normal burst nominal power of the received burst, wherein the normal burst nominal power is formed according to a second hypothesis that the received burst is a normal burst;
  a likelihood unit generating a noise power of the received burst, wherein the likelihood of the received burst is determined according to the dummy burst nominal power, the normal burst nominal power and the noise power of the received burst; and
  a decision unit determining whether the received burst is a dummy burst according to the likelihood.

8. The system as claimed in claim 7, wherein the likelihood unit selects the larger of the dummy burst nominal power and the normal burst nominal power max[$\eta_{DB}^2,\eta_{NB}^2$], generates the expectation of the square of received burst E[$r^2$], and subtracts E[$r^2$] with the selected nominal power max[$\eta_{DB}^2,\eta_{NB}^2$] to obtain the noise power $\sigma^2$.

9. The system as claimed in claim 8, wherein the likelihood is derived by $$L = \frac{\eta_{DB}^2 - \eta_{NB}^2}{\sigma^2},$$

where the L is the likelihood, $\eta_{DB}^2$ is the dummy burst nominal power of the received burst, $\eta_{NB}^2$ is the normal burst nominal-power of the received burst, and $\sigma^2$ is the noise power of the received burst.

10. The system as claimed in claim 9, wherein the likelihood is derived by $$L_s = \sum_i \frac{\eta_{DB}^2(i) - \eta_{NB}^2(i)}{\sigma_i^2},$$

where the Ls is the likelihood of a received data block, each received data block comprises a plurality of bursts indexed by i, $\eta_{DB}^2(i)$ is the dummy burst nominal power of a i-th burst of the received data block, $\eta_{NB}^2(i)$ normal burst nominal power of the i-th burst of the received data block, and $\sigma_i^2$ is the noise power of the i-th burst of the received data block.

11. The system as claimed in claim 7, wherein the dummy burst nominal power unit generates a radio frequency channel (C0) nominal power and a Corresponding Training Sequence Code (CTSC) nominal power and selects the larger of C0 nominal power and the CTSC nominal power as the dummy burst nominal power, wherein the C0 nominal power is formed according to a third hypotheses that the received burst is a dummy burst with a C0 sequence, and the CTSC nominal power is formed according to a fourth hypotheses that the received burst is a dummy burst with a mapped sequence CTSC.

12. The sytem as claimed in claim 7, wherein the normal burst nominal power unit generates a GMSK nominal power and a EPSK normal burst nominal power and selects the larger of GMSK nominal power and the EPSK normal burst nominal power as the normal burst nominal power, wherein the GMSK nominal power is formed according to a fifth hypothesis that the received burst is modulated by GMSK, and the EPSK normal burst nominal power formed according to a sixth hypothesis that the received burst is modulated by EPSK.

13. The system as claimed in claim 9, further comprising a diversity unit collecting all likelihoods of the received bursts among a received data block and obtaining an averaged likelihood of the received data block according to the collected likelihoods, wherein the decision unit further determines whether the received data block is a dummy burst block according to the averaged likelihood.

14. A method for detecting a dummy burst, comprising:
  generating a dummy burst nominal power of a received burst, wherein the dummy burst nominal power is formed according to a first hypothesis that the received burst is a dummy burst;
  generating a normal burst nominal power of the received burst, wherein the normal burst nominal power is formed according to a second hypotheses that the received burst is a normal burst;

determining a likelihood of the received burst according to the dummy burst nominal power and the normal burst nominal power;

determining that the received burst is a dummy burst when the likelihood exceeds a first threshold;

collecting all likelihoods of the received bursts among a received data block;

obtaining an averaged likelihood of the received data block according to the collected likelihoods; and determining that the received data block is a dummy burst block when the averaged likelihood exceeds a second threshold.

15. A system for detecting a dummy burst, comprising:

a dummy burst nominal power unit for generating a dummy burst nominal power of a received burst, wherein the dummy burst nominal power is formed according to a first hypothesis that the received burst is a dummy burst;

a normal burst nominal power unit for generating a normal burst nominal power of the received burst, wherein the normal burst nominal power is formed according to a second hypothesis that the received burst is a normal burst;

a likelihood unit determining a likelihood of the received burst according to the dummy burst nominal power and the normal burst nominal power; and a decision unit determining whether the received burst is a dummy burst according to the likelihood;

a likelihood collecting unit for unit collecting all likelihoods of the received bursts among a received data block;

an averaged likelihood unit for obtaining an averaged likelihood of the received data block according to the collected likelihoods; and a second decision unit for determining that the received data block is a dummy burst block when the averaged likelihood exceeds a second threshold.

* * * * *